United States Patent Office 3,384,640
Patented May 21, 1968

3,384,640
AMINO ISOQUINOLINIUM SALTS
Joseph Martin Muchowski, La Salle, Quebec, Canada, assignor, by mesne assignments, to Bristol-Myers Company, New York, N.Y., a corporation of Delaware
No Drawing. Filed Mar. 15, 1966, Ser. No. 534,414
11 Claims. (Cl. 260—286)

This invention relates to novel compounds. More particularly, this invention relates to novel compounds which possess valuable therapeutic utility as antidepressants, and to processes useful in the preparation thereof. In another aspect, this invention relates to a novel method of treating psychic depression.

It is an object of the present invention to provide a new class of therapeutic compounds. It is another object of the present invention to provide novel compounds having antidepressant activity. It is a further object of the present invention to provide processes for preparing the novel therapeutic compounds. It is still a further object of the present invention to provide a novel method of treating psychic depression.

These and other objects which may appear as the specification proceeds are achieved by this invention which comprises the provision of compounds represented by the following structural formula

I

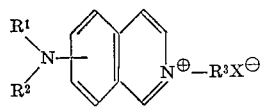

wherein:

$R^1$ is hydrogen or (lower)alkyl,
$R^2$ is hydrogen, (lower)alkyl, (lower)alkanoyl or phenyl(lower)alkyl
$R^3$ is (lower)alkyl or phenyl(lower)alkyl, and
X is a pharmaceutically acceptable nontoxic anion, e.g., a chloride, bromide, or iodide radical, or an alkyl sulfonate such as methane sulfonate or a substituted or unsubstituted aryl sulfonate group such as naphthalene sulfonate.

The term "(lower)alkyl" as used herein means both straight and branched chain alkyl radicals containing from 1 to 8 carbon atoms, e.g., methyl, ethyl, propyl, isopropyl, butyl, isobutyl, t-butyl, amyl, hexyl, 2-ethylhexyl, etc.

Similarly, where the term "(lower)" is used as part of the description of another group, e.g., (lower)alkoxy, it refers to the alkyl portion of such group which is therefore as described in connection with "(lower)alkyl."

A preferred group of compounds of this invention are those of the formula

II

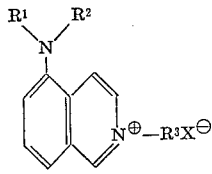

wherein $R^1$, $R^2$, $R^3$ and X are as described above.

A more preferred group of compounds of this invention are those of the formula

III

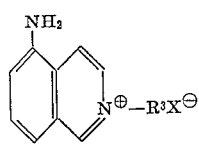

wherein $R^3$ is as represented above. However, it is preferred that $R^3$ represent (lower)alkyl.

The compounds of this invention are valuable pharmaceutical agents. They exert an antidepressant effect in animals, and are therefore useful as antidepressant agents.

The antidepressant effect of the compounds of this invention is demonstrated by their ability to prevent the sedative effects of reserpine in mice. Oral administration of as little as 1 mg./kg. of a preferred compound of the present invention, 5-acetamido-2-methylisoquinolinium iodide, in mice three hours before intravenous administration of 5 mg./kg. of reserpine completely prevented symptoms usually associated with reserpine administration, i.e., increased motor activity, profuse salivation and ptosis. 5-amino-2-methylisoquinolinium chloride was also active at 1 mg./kg. in the foregoing test. Thus, these compounds exhibit marked antidepressant activity.

The novel compounds of this invention can be prepared by the following procedure which is exemplified below. The compounds are prepared by reacting a substituted isoquinoline of the formula

IV

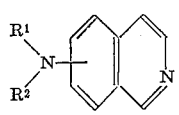

wherein $R^1$ and $R^2$ are as described above, with a compound of the formula (V)      $R^3X$ wherein $R^3$ and X are as represented above in a suitable solvent medium, such as acetonitrile, preferably at elevated temperature, e.g. reflux temperature.

The compounds of this invention, wherein X is chloride, can be conveniently prepared from the corresponding iodide compound by contacting the iodide with an anion exchange resin in the chloride ion form.

The starting materials used to prepare the compounds of this invention are either well known in the art, or easily prepared in accordance with standard organic procedures previously described in the literature. For example, use may be made of Craig et al., J. Am. Chem. Soc. 64, 783 (1942) for the preparation of several of the substituted isoquinolines of Formula IV.

The compounds of this invention may be compounded and formulated into pharmaceutical preparations in unit dosage form for oral or parenteral administration with organic or inorganic solid materials or liquids which are pharmaceutically acceptable carriers. The compositions may take the form of tablets, powders, granules, capsules, suspensions, solutions and the like. Such compositions are considered within the scope of this invention.

The compositions of this invention when administered orally or parenterally, in an effective amount, are effective in the treatment of psychic depression.

The following examples are intended to illustrate the invention described herein without unduly restricting it.

EXAMPLE 1

Preparation of 5-acetamido-2-methylisoquinonlinium iodide

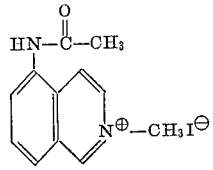

To a solution of 7.89 gm. (0.0427 mol) of 5-acetamido isoquinoline in 250 ml. of hot acetonitrile was added a solution of 6.5 gm. (0.458 mol) of methyl iodide in 30 ml. of solution was then heated at reflux temperature for acetonitrile. The solution took on a deep yellow color. The thirty minutes at which time some of the product had crystallized on the walls of the reaction flask. After cooling, 11.09 gm. of yellow crystals were collected which had M.P. 212–216° C. Work up of the mother liquor gave a further 0.86 gm. of material with M.P. 210–213° C. The total yield was 11.95 gm. of 5-acetamido-2-methylisoquinolinium iodide. After recrystallization from acetonitrile, the melting point was 213.5–215.5° C. (with prior softening). The analytical sample was dried at 77° C., in vacuo, during 24 hours.

*Analysis.*—Calc'd for $C_{12}H_{13}IN_2O$: C, 43.91; H, 3.99. Found: C, 44.69, 44.09; H, 3.46, 4.16.

EXAMPLE 2

Preparation of 5-formamidoisoquinoline

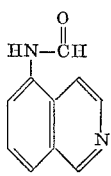

A solution of 6.16 gm. of 5-aminoisoquinoline in 65 ml. of 100% formic acid was heated at reflux temperature for one hour. The reaction mixture was poured onto ca. 200 gm. of crushed ice and solid sodium carbonate was added until the mixture was basic. The resulting mixture was extracted with ethyl acetate. The extract was shaken once with saturated salt solution and then dried over anhydrous sodium sulfate. The extract was concentrated in vacuo at 40° C. to a volume of about 150 ml. at which time white needles began to appear. The first crop of white yellow needles weighed 3.95 gm. and melted at 177.2–178.2° C. A second crop (1.87 gm.; M.P. 175.8–176.8° C.) was obtained by concentration of the mother liquors. The total yield of 5-formamidoisoquinoline was 5.72 gm. The analytical sample was recrystallized four times from ethyl acetate and then dried at 100° C., in vacuo, during 24 hours.

*Analysis.*—Calc'd for $C_{10}H_8N_2O$: C, 69.76; H, 4.69. Found: C, 69.12, 70.29; H, 4.89, 4.57.

EXAMPLE 3

Preparation of 5-formamido-2-methylisoquinolinium iodide

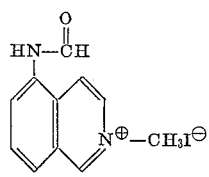

To a solution of 3.0 gm. of 5-formamidoisoquinoline in 90 ml. of acetonitrile was added 3.10 gm. of methyl iodide. The resulting solution was then heated at reflux temperature. After five minutes at this temperature a crystalline solid separated out. Stirring at reflux temperature was continued during thirty minutes. After cooling to room temperature, and finally in ice, there was obtained 4.79 gm. of the methiodide, M.P. 221–222.5° C. (dec., sealed tube). A second crop (0.22 gm.) was obtained from the mother liquors. Total yield of 5-formamido-2-methylisoquinolinium iodide was 5.01 gm.

The analytical sample was recrystallized four times from methanol to yield transparent yellow needles melting at 224.8–227.5° C. (gas evolution) after drying for 24 hours at 100° C. in vacuo.

*Analysis.*—Calc'd for $C_{11}H_{11}IN_2O$: C, 42.06; H, 3.53. Found: C, 41.74; H, 3.27.

EXAMPLE 4

Preparation of 5-amino-2-methylisoquinolinium iodide

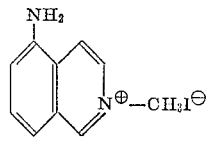

A solution of 5.634 gm. (0.039 mol) of 5-aminoisoquinoline in 180 ml. of acetonitrile was stirred and 5.54 gm. (0.039 mol) of methyl iodide were added. The solution was heated at reflux temperature for thirty minutes. It was then placed in a cold room for one day at 5° C. The crystalline product thus formed was filtered off and dried in vacuo. Yield of 5-amino-2-methylisoquinolinium iodide was 9.682 gm., M.P. 225–226° C. (sealed tube). On successive recrystallizations from ethanol, it showed melting points of 225–228° C., 226–227.2° C., 225–226° C. and 226–227° C. The analytical sample was dried in vacuo, over phosphorus pentoxide for fifteen hours at 77° C.

*Analysis.*—Calc'd for $C_{10}H_{11}N_2I$: C, 41.97; H, 3.88. Found: C, 42.12; H, 3.85.

EXAMPLE 5

Preparation of 5-amino-2-methylisoquinolinium chloride

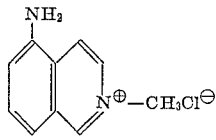

A solution of 2.85 gm. of 5-amino-2-methylisoquinolinium iodide in 200 ml. of methanol was mixed with 20 gm. of strongly basic anion exchange resin (Dowex 2–X8) in the chloride ion form. The resulting mixture was stirred at room temperature during thirty minutes. The methanolic solution was decanted and the resin was then washed several times with methanol. The combined methanolic extract was again stirred with 20 gm. of the resin during thirty minutes after which time the solution gave a negative iodide test. The resin was filtered off, washed with methanol and the methanolic solution was concentrated in vacuo. This procedure yielded a yellow solid which was recrystallized from ethanol giving 1.36 gm. of yellow crystals melting at 268–273° C. A second crop was isolated (0.29 gm.) raising the total yield to 1.65 gm. of 5-amino-2-methylisoquinolinium chloride.

The analytical sample was recrystallized several times from ethanol and then dried in vacuo over phosphorus pentoxide at 77° C. during 18 hours; M.P. 285–287° C. (dec.).

*Analysis.*—Calc'd for $C_{10}H_{11}N_2Cl$: N, 14.39. Found: N, 14.53.

EXAMPLE 6

When, in the procedure of Example 1, 5-acetamidoisoquinoline is replaced by an equal molar amount of:

5-methylaminoisoquinoline,
5-ethylaminoisoquinoline,
5-propylaminoisoquinoline,
6-acetamidoaminoisoquinoline,
5-benzylaminoisoquinoline,
5-isopropylaminoisoquinoline,
5-phenethylaminoisoquinoline,
5-phenylisopropylaminoisoquinoline,
8-hexylaminoisoquinoline,
6-methylaminoisoquinoline,
5-dimethylaminoisoquinoline,
7-benzylaminoisoquinoline,
6-benzylaminoisoquinoline,
7-methylaminoisoquinoline, 8-methylaminoisoquinoline and
5-(N-benzyl-N-ethylamino)isoquinoline, there are obtained:

5-methylamino-2-methylisoquinolinium iodide,
5-ethylamino-2-methylisoquinolinium iodide,
5-propylamino-2-methylisoquinolinium iodide,
6-acetamidoamino-2-methylisoquinolinium iodide,
5-benzylamino-2-methylisoquinolinium iodide,
5-isopropylamino-2-methylisoquinolinium iodide,
5-phenethylamino-2-methylisoquinolinium iodide,
5-phenylisopropylamino-2-methylisoquinolinium iodide,
8-hexylamino-2-methylisoquinolinium iodide,
6-methylamino-2-methylisoquinolinium iodide,
5-dimethylamino-2-methylisoquinolinium iodide,
7-benzylamino-2-methylisoquinolinium iodide,
6-benzylamino-2-methylisoquinolinium iodide,
7-methylamino-2-methylisoquinolinium iodide,
8-methylamino-2-methylisoquinolinium iodide, and
5-(N-benzyl - N - ethylamino) - 2 - methylisoquinolinium iodide, respectively.

EXAMPLE 7

When, in the procedure of Example 4, 5-aminoisoquinoline is replaced by an equal molar amount of:

6-aminoisoquinoline,
7-aminoisoquinoline, and
8-aminoisoquinoline, there are obtained:

6-amino-2-methylisoquinolinium iodide,
7-amino-2-methylisoquinolinium iodide, and
8-amino-2-methylisoquinolinium iodide, respectively.

EXAMPLE 8

When, in the procedure of Example 5, 5-amino-2-methyisoquinolinium iodide is replaced by each of the products of Example 7, there are obtained:

6-amino-2-methylisoquinolinium chloride,
7-amino-2-methylisoquinolinium chloride, and
8-amino-2-methylisoquinolinium chloride, respectively.

EXAMPLE 9

When, in the procedure of Example 4, methyl iodide is replaced by an equal molar amount of:

methyl bromide,
methyl chloride,
ethyl iodide,
propyl iodide,
isopropyl iodide,
methane sulfonic acid,
ethane sulfonic acid,
2-propane sulfonic acid,
β-naphthalene sulfonic acid,
α-naphthalene sulfonic acid,
p-nonylbenzene sulfonic acid,
p-toluene sulfonic acid,
p-cymene sulfonic acid,
p-chlorobenzene sulfonic acid,
m-nitrobenzene sulfonic acid,
6,7-dihydroxy-3-naphthalene sulfonic acid,
4-acetamidobenzene sulfonic acid,
2,4-dimethylbenzene sulfonic acid,
p-methoxybenzene sulfonic acid, and
p-acetoxybenzene sulfonic acid, there are obtained:

5-amino-2-methylisoquinolinium bromide,
5-amino-2-methylisoquinolinium chloride,
5-amino-2-ethylisoquinolinium iodide,
5-amino-2-propylisoquinolinium iodide,
5-amno-2-isopropylisoquinolinium iodide,
5-aminoisoquinolinium methane sulfonate,
5-aminoisoquinolinium ethane sulfonate,
5-aminoisoquinolinium-2-propane sulfonate,
5-aminoisoquinolinium-β-naphthalene sulfonate,
5-aminoisoquinolinium-α-naphthalene sulfonate,
5-aminoisoquinolinium-p-nonylbenzene sulfonate,
5-aminoisoquinolinium-p-toluene sulfonate,
5-aminoisoquinolinium-p-cymene sulfonate,
5-aminoisoquinolinium-p-chlorobenzene sulfonate,
5-aminoisoquinolinium-m-nitrobenzene sulfonate,
5 - aminoisoquinolinium - 6,7 - dihydroxy-3-naphthalene sulfonate,
5-aminoisoquinolinium-4-acetamidobenzene sulfonate,
5-aminoisoquinolinium-2,4-dimethylbenzene sulfonate,
5-aminoisoquinolinium-p-methoxybenzene sulfonate and
5-aminoisoquinolinium-p-acetoxybenzene sulfonate, respectively.

While the foregoing invention has been described in terms of its preferred embodiment, those skilled in the art will appreciate that modifications can be made without departing from the spirit and scope of this invention.

What is claimed is:

1. A compound of the formula:

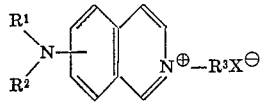

wherein:
$R^1$ is a member selected from the group consisting of hydrogen and (lower)alkyl,
$R^2$ is a member selected from the group consisting of hydrogen, (lower)alkyl, (lower)alkanoyl and phenyl (lower)alkyl,
$R^3$ is a member selected from the group consisting of (lower)alkyl and phenyl(lower)alkyl, and
X is a pharmaceutically acceptable nontoxic anion.

2. A compound of claim 1 having the formula:

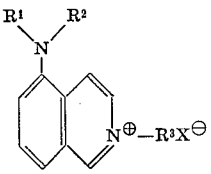

wherein:
$R^1$ is a member selected from the group consisting of hydrogen, and (lower)alkyl,
$R^2$ is a member selected from the group consisting of hydrogen, (lower) alkyl, (lower)alkanoyl and phenyl (lower)alkyl,
$R^3$ is a member selected from the group consisting of (lower)alkyl and phenyl(lower)alkyl, and
X is a pharmaceutically acceptable nontoxic anion.

3. A compound of claim 1 having the formula:

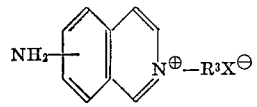

wherein:
$R^3$ is a member selected from the group consisting of (lower)alkyl and phenyl(lower)alkyl, and
X is a pharmaceutically acceptable nontoxic anion.

4. A compound of claim 1 having the formula:

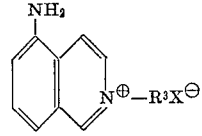

wherein:

R³ is a member selected from the group consisting of (lower)alkyl and phenyl(lower)alkyl, and
X is a pharmaceutically acceptable nontoxic anion.

5. A compound of claim 1 having the formula:

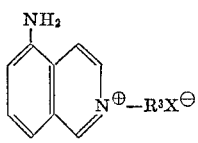

wherein:
R³ is (lower)alkyl, and
X is a pharmaceutically acceptable nontoxic anion.

6. A compound of claim 1 having the formula:

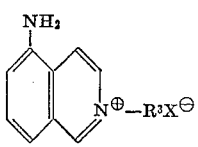

wherein X is a pharmaceutically acceptable nontoxic anion.

7. A compound of claim 1 having the formula:

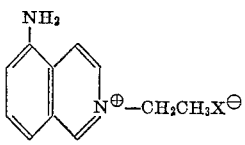

wherein X is a pharmaceutically acceptable nontoxic anion.

8. A compound of claim 1 having the formula:

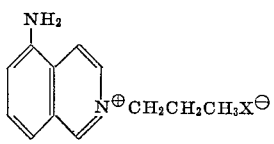

wherein X is a pharmaceutically acceptable nontoxic anion.

9. A compound of claim 1 having the formula:

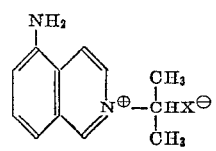

wherein X is a pharmaceutically acceptable nontoxic anion.

10. The compound of claim 1 having the formula:

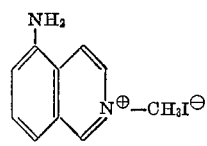

11. The compound of claim 1 having the formula:

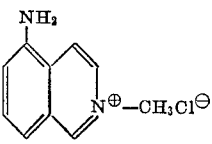

References Cited

UNITED STATES PATENTS 2,593,798   4/1952   Robinson _____ 260—288 X
2,666,059  12/1954   Davis et al. _____ 260—288

OTHER REFERENCES

Borger: "Medicinal Chemistry," Interscience, 2d Ed., pp. 42 and 497 (1960).

ALEX MAZEL, *Primary Examiner.*

D. Daus, *Assistant Examiner.*